Patented Sept. 9, 1947

2,427,316

UNITED STATES PATENT OFFICE 2,427,316

UNSATURATED CARBOXY GUANAMINES

Jack Theo Thurston, Cos Cob, and Daniel Elmer Nagy, Stamford, Conn., assignors to American Cyanamid Company, New York, N. Y., a corporation of Maine No Drawing. Application August 30, 1941, Serial No. 409,130

4 Claims. (Cl. 260—249.5)

This invention relates to guanamines in which the 2-carbon atom of the 4,6-diamino-1,3,5-triazine ring contains as the substituent group an unsaturated carboxylic acid which may be either aliphatic or cyclo-aliphatic.

The guanamines of the present invention are of particular significance as they react with formaldehyde to form resins which are soluble in aqueous alkaline medium and can be applied to materials as textile finishes which on curing by heat are transformed from a water-soluble to a water-insoluble form and when incorporated with other aldehyde resin-forming compounds having a hydrophobic group they serve as water repellents for textiles and paper. An important characteristic of these finishes is that the water-repellency is effected without objectionable stiffening of the goods. In other words, the finish does not form a continuous film from fiber to fiber.

The products of the present invention can be produced by various methods and the invention is not limited to any particular method of preparation. Two processes are, however, preferred because of their simplicity and cheapness. In one process a dibasic acid ester is combined with two moles of a biguanide, preferably in a solvent, and the product is isolated as the biguanide salt or ester of a carboxy guanamine. A similar result can be effected by reacting an alkali metal salt of a half ester of a dibasic acid with a biguanide in which case the sodium salt of the carboxy substituted guanamine is obtained.

The most important products of the present invention are the ones prepared from biguanide itself. In these products the amino groups of the triazine ring are unsubstituted and the products can be prepared with best yields and simplest procedures. However, the present invention also includes products prepared from substituted biguanides such as phenyl biguanide, allyl biguanide or dimethyl biguanide, in which cases the correspondingly substituted guanamines are obtained. When substituted biguanides are reacted, the reaction does not proceed as rapidly and as completely and it is sometimes desirable to add a condensing agent such as a metal alkoxide to facilitate the reaction. The products derived from unsubstituted biguanide can usually be prepared without condensing agents but in some cases it may be desirable to accelerate the reaction by the use of a condensing agent.

In general the preferred process of the present invention operates best in the presence of a suitable solvent for the biguanide and/or the ester. I have found that the lower molecular weight alcohols are particularly effective as they are good solvents for biguanide. The cheap monohydric paraffin alcohols such as methanol and ethanol operate well and are of particular advantage because the most readily available esters of the carboxylic acids are usually the methyl and ethyl esters, and if an alcohol is used as a solvent corresponding to the alcohol radical of the ester, no separation problem arises. Excellent results are, however, obtained with the lower monohydric alcohols such as the ether alcohols, for example, the ethyl ether of ethylene glycol.

The present invention will be described in greater detail in conjunction with the following specific examples which are typical illustrations. The parts are by weight.

Example 1

β-Carboxyacryloguanamine

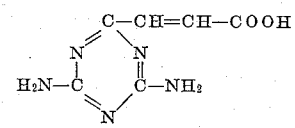

Seventy-three parts of methyl 2-ethylhexyl maleate were added to 25 parts of biguanide dissolved in 100 parts of methanol. The reaction mixture became warm and the product began to precipitate immediately. The yield of the crude biguanide salt of β-carboxyacryloguanamine was 82.5%. This product was dissolved in water and precipitated by acidifying to a pH of about 4.0. After filtering and washing, the guanamine was purified by dissolving in sodium hydroxide and reprecipitating with acid. The yield of pure product which did not melt but became brown at 335° C., was 75%. Maleoguanamine, the corresponding ditriazine, was absent.

Example 2

β-Carboxyacryloguanamine

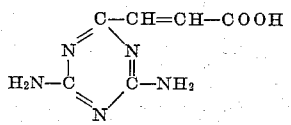

The same procedure as given in Example 1 was followed using 25 parts of biguanide, 51.6 parts of ethyl fumarate and 100 parts of methanol. The yield of crude guanamine was 94%, which after dissolving in caustic soda and reprecipitating with acid, gave about 87% of purified product which did not melt but becomes brown at 335° C. The fumaroguanamine, the corresponding ditriazine, was absent.

Example 3

β-Carboxyacryloguanamine

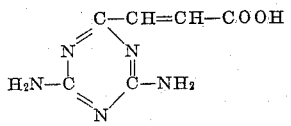

Fifty-one parts of biguanide were added to 36 parts of dimethyl fumarate dissolved in 400 parts of warm methanol. Product began to separate before all of the biguanide had dissolved and after standing overnight the product was filtered from the solvent and washed with cold methanol. A mixture was obtained in about 75.6% yield and after purification about 30.4% yield of the β-carboxyacryloguanamine was obtained together with about 14% of the diguanamine having the formula:

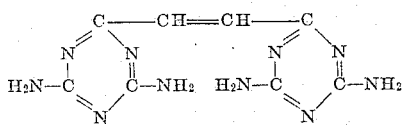

Example 4

β-Carboxyacryloguanamine

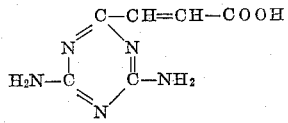

310 parts of biguanide were added to 458 parts of sodium methyl maleate dissolved in 1200 parts of methanol. The reaction mixture was then stirred for about 12 hours, even though the product appeared to be completely precipitated in about three hours. The crude sodium β-carboxyacryloguanamine was filtered from the solvent and after drying amounted to 203 parts. The filtrate was evaporated to a heavy syrup and diluted with about 3000 parts of water and then acidified to a pH of about 4.0. The precipitated β-carboxyacryloguanamine was filtered, washed with water, and after drying amounted to 162 parts. Thus the over-all yield of β-carboxyacryloguanamine calculated on the basis of free acid and the sodium salt was 66%.

Example 5

Itaconoguanamine

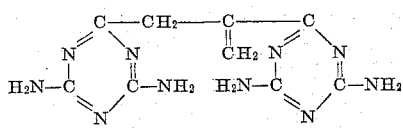

and

Methylene-β-carboxypropionoguanamine

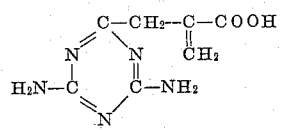

37.2 parts of diethyl itaconate were caused to react with 40 parts of biguanide in about 140 parts of methanol. Within an hour the guanamine began to precipitate and the reaction mixture was allowed to stand overnight. The product was removed by filtration and then extracted with several portions of water, in order to remove the biguanide salt of methylene-β-carboxypropionoguanamine which was recovered in a yield of about 11% from the water solution by acidification to a pH of about 4.0. The yield of itaconoguanamine, which was left from the above water extraction was about 42%.

Example 6 o-Carboxy-endomethylene-tetrahydrobenzoguanamine

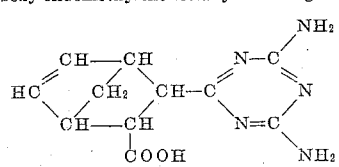

Fifty parts of biguanide were added to 109 parts of sodium methyl endomethylene-tetrahydrophthalate dissolved in 300 parts of methanol. This reaction mixture was stirred for about 24 hours and then filtered. The insoluble sodium salt was washed with about 200 parts of methanol and the combined methanol filtrates evaporated to yield more product. The sodium salt was dissolved in 300 parts of water and acidified to a pH of about 4.0 in order to precipitate the o-carboxy-endomethylene-tetrahydrobenzoguanamine. The yield of product melting with decomposition at 227° C. was 57%.

We claim:

1. Guanamines having the following formula:

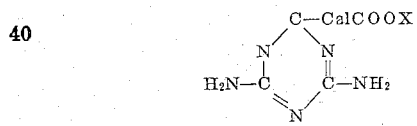

in which Cal is an olefinic cycloaliphatic radical, X is a member of the group consisting of hydrogen or a salt forming group, and the bond between Cal and the 2-carbon atoms of the guanamine ring is a carbon-to-carbon bond.

2. A process of preparing a carboxy guanamine which comprises dissolving a biguanide and a member selected from the group consisting of the alkyl diesters and metal salts of alkyl half esters of olefinic aliphatic and olefinic cycloaliphatic dibasic acids whereby reaction and precipitation of the product guanamine is instituted, continuing reaction until precipitation substantially ceases, and recovering the resultant guanamine.

3. A process according to claim 2 in which the biguanide is biguanide.

4. A process according to claim 3 in which the reaction is effected in solution in a monohydric lower paraffin alcohol.

JACK THEO THURSTON.
DANIEL ELMER NAGY.